June 16, 1964

H. CATLING ETAL 3,137,040

MATERIAL THICKNESS DETECTION MEANS FOR
SCUTCHERS AND LIKE MACHINES

Filed March 28, 1961

INVENTORS:
HAROLD CATLING
ALBERT E. DE BARR
ARTHUR LINNERT

BY Frederick Breitenfeld
ATTORNEY

June 16, 1964  H. CATLING ETAL  3,137,040
MATERIAL THICKNESS DETECTION MEANS FOR
SCUTCHERS AND LIKE MACHINES
Filed March 28, 1961  2 Sheets-Sheet 2

INVENTORS:
HAROLD CATLING
ALBERT E. DEBARR
ARTHUR LINNERT
BY Frederick Breitenfeld
ATTORNEY United States Patent Office 3,137,040
Patented June 16, 1964

3,137,040
MATERIAL THICKNESS DETECTION MEANS FOR SCUTCHERS AND LIKE MACHINES
Harold Catling, Manchester, Albert E. De Barr, Cheadle, and Arthur Linnert, Manchester, England, assignors to The Cotton Silk and Man-Made Fibres Research Association
Filed Mar. 28, 1961, Ser. No. 98,892
11 Claims. (Cl. 19—97.5)

This invention concerns scutchers and like machines in which a continuous length of material passes through the machine and is subjected to treatment which modifies its weight per unit length.

Problems arise in such machines in preserving constancy of the weight per unit length of the material emerging from the machine. A simple method, directed towards preserving such constancy, which assumes the thickness of the material and the weight per unit area thereof to be directly proportional and which has been adopted, for example, in a scutcher, is to provide means sensitive to the thickness of the material fed to the machine, and to use this means to modify the action of the machine compensatively in accordance with sensed variations in said thickness. In an attempt to take into account thickness variations across the width of the incoming material a plurality of thickness detecting means have been spaced across the width of the material and it has been arranged that the modification of the machine action is in response to an average reaction of the detectors. Such a method, as conventionally used in scutchers, involves the use of a mechanism known as a piano link motion, to obtain such average reaction, but unfortunately, such motions have substantial disadvantages. For example, they are very unwieldy and cumbersome, and they relay on gravity for their operation. Furthermore, due to certain factors, such a method is inaccurate in operation. For example, if, as in known tripod feed regulators (as the conventional scutcher mechanism which employs a piano link motion is called) the detectors, in order to be sensitive to the thickness of the incoming material, bear against the material with a force which is substantially constant at all times, then due to the fact that the thickness of a mass of fibrous material such as cotton under constant force is not directly proportional to the weight per unit area of the material, inaccuracies occur in operation.

The principal object of the present invention is to provide a simple, convenient, inexpensive and compact alternative to the piano link motion, and a further important object of the present invention is to avoid such inaccuracies as have been referred to hereinbefore.

According to the present invention, means for progressing fibrous material which is being continuously processed in a machine comprises a roller, a plurality of detectors disposed in operative relationship across the face of said roller, and each mounted so as to be urged towards the roller in like manner, a reaction member for said detectors, said roller or said reaction member being fixed and said reaction member or said roller, as the case may be, being mounted so as to be urged theretowards, and means sensitive to movement of said roller, or said reaction member, as the case may be, as material of varying thickness passes between said roller and said detectors and adapted to make such compensatory adjustments to the machine processing action as will preserve a substantially even feed of material. Where the roller is the feed roller of a machine such adjustments may for example be to the speed of the feed roller or to the rate at which the material is fed to said roller.

Preferably the loading of the detectors will be by resilient means such as helical springs and it is also preferred that the stiffness of the springs be such that the relationship between the weight per unit length and the thickness of the material will be substantially linear over a given working range. The reaction member or the feed roller, as the case may be, may likewise be loaded by resilient means and such means may be matched to the resilient means which load the detectors.

The invention will now be described further, by way of example, with reference to the accompanying drawings in which.

Figure 1:
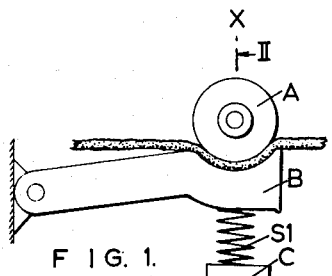
FIGURE 1 is a diagrammatic end elevation of a scutcher feed roller having associated therewith detectors according to the invention.
Figure 2:
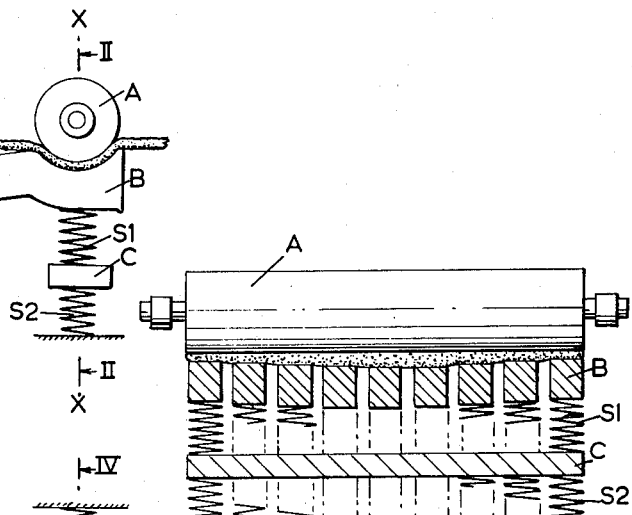
FIGURE 2 is a diagrammatic sectional view on the line II—II of FIGURE 1.
Figure 5:
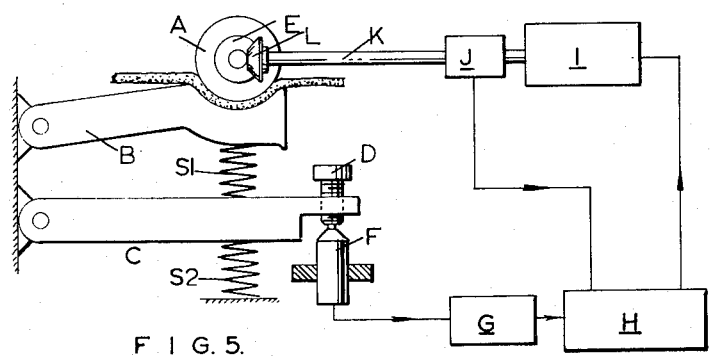
FIGURE 5 is a diagrammatic representation of an arrangement similar to that of FIGURE 1 but including suitable means for making compensatory adjustments to the speed of the feed roller.

Referring to FIGURES 1 and 2, A is a scutcher feed roller, B is one of a series of identical pivotally mounted detectors extending side by side across the machine beneath the feed roller A, and having a similar function as the conventional pedal nose, and C is a single reaction member, also extending across the machine beneath the detectors B. The ends of the reaction member C may be accommodated in suitable guides (not shown) which permit the member C to move in a direction perpendicular to its wider faces. A helical compression spring S1, between each detector B and the reaction member C urges the former towards the feed roller A. The reaction member itself is supported by a suitable number of compression springs S2. Means, such as the transducer F and elements G, H, I and J, of FIGURE 5, are associated with the reaction member C, and are adapted appropriately to increase the speed of the feed roller A if the average thickness of fibrous material being fed between the feed roller A and the detectors B, as manifested in corresponding movement of the reaction member C, decreases, and vice versa. The reaction member C may be provided with an overhang (not shown) carrying a screw, such as the screw D of FIGURE 5, for actuating the transducer F.

The springs S1 (the springs S2 being preferably matched therewith) are designed so that their stiffness is such that the relationship between the weight per unit length and the thickness of the fibrous material is substantially linear over the normal working range. Thus, the separation of feed roller A and reaction member C will be exactly proportional to the weight per unit length of material passing between feed roller A and detectors B. The arrangement is therefore very accurate in operation.

It will be noted that all forces are in what is, for all practical purposes, the line of movement XX (FIGURE 1) and this leads to low frictional resistance and therefore increased sensitivity.

Furthermore, the arrangement is mechanically very compact.

Figure 3:
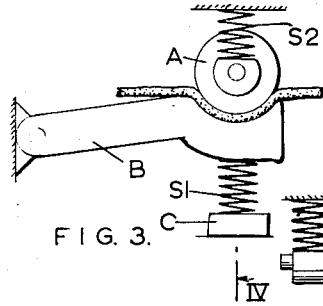
FIGURE 3 is a diagrammatic end elevation of an alternative arrangement to that shown in FIGURE 1.
Figure 4:
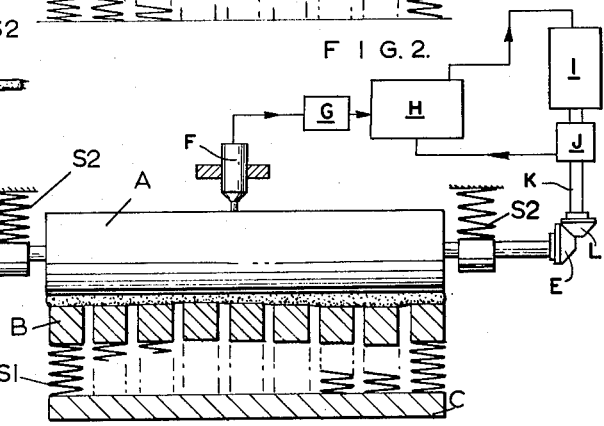
FIGURE 4 is a diagrammatic sectional view on the line IV—IV of FIGURE 3.

In FIGURES 3 and 4 the reference letters A, B, C, S1 and S2 are applied to similar parts as those of FIGURE 1. In this arrangement however, the reaction member C is fixed and the feed roller A constrained for movement relative thereto by helical compression springs S2. The speed control mechanism is sensitive to movement of the feed roller A for which suitable guides (not shown) are provided which permit movement of the roller in a direction along the axes of the springs S2. The speed control mechanism may include a transducer, such as the transducer F of FIGURE 5, operatively associated with the surface of the roller A and located in the plane containing the axes of the springs S2. In both arrangements suitable driving means for roller A, such as is shown in FIGURE 5, is of course provided.

It will be noted that the feed means according to the present invention is not dependent for its action on the force of gravity, and therefore, in a scutcher, for example, can be located anywhere around the periphery of the beater. Thus, in one embodiment, the feed is direct to the beater from a vertical hopper.

It will also be appreciated that a feed means according to the invention and with a constant load applied to the material by the detectors (e.g. using springs of low rate instead of the specially designed springs S1) has the very substantial advantages of mechanical compactness and no reliance on gravity, although not as accurate as an arrangement with springs designed as hereinbefore described.

Although separate springs for loading the detectors have been described, it is possible to construct the detectors as leaf springs, in which case no separate loading springs are necessary.

Figure 6:
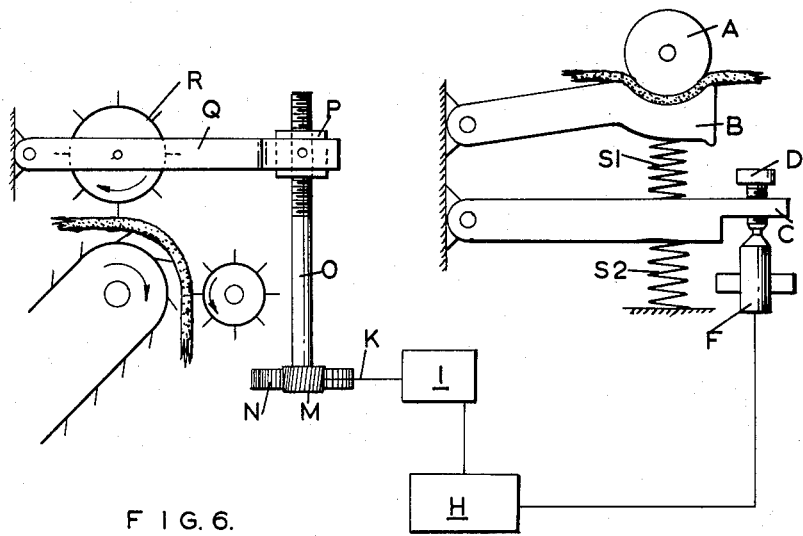
FIGURE 6 is a diagrammatic representation of an arrangement similar to FIGURE 1 but including suitable means for making compensatory adjustments to the feed of material to the scutcher.
Figure 7:
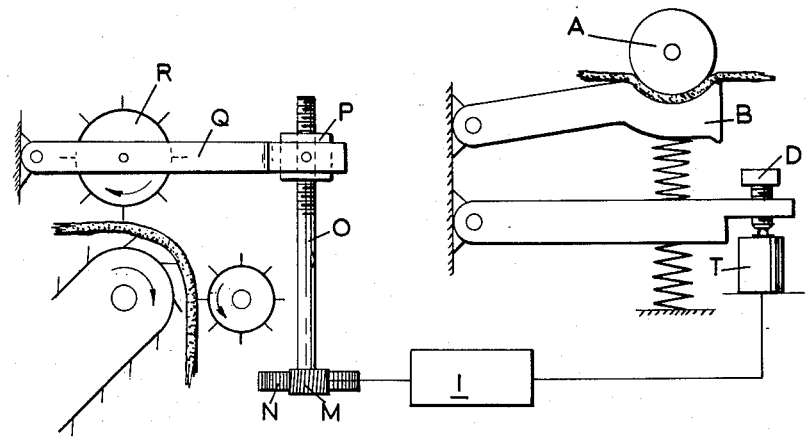
FIGURE 7 is a diagrammatic representation of a modified form of arrangement of FIGURE 6.

In FIGS. 5, 6 and 7 the general arrangement of feed roller, detectors, springs and reaction member is similar to that of FIGURES 1 and 2 (the same reference letters being applied to these parts as in the latter figures) except that the reaction member is shown as a pivoted plate (with a screw-threaded hole at its free end carrying a flat ended screw D), and one end of the roller A carries a gear E to facilitate the driving of same. Open loop control of the feeding of material by the roller A is obtained in FIGURES 4 and 5 by a system comprising a transducer F, a function generator G, an amplifier H, a variable speed motor I and a tachometer-generator J. The motor has an extended shaft K carrying a gear L in mesh with the gear E on the end of roller A.

The transducer F produces an electrical signal which is proportional, by virtue of the transmission of the movement of reaction member C thereto, to the thickness of the material passing between roller A and detectors B. The datum level of this signal is set by adjustment of screw D. The function generator G converts this signal into one which is proportional to the reciprocal of this thickness, which signal is in turn amplified by the amplifier H before being fed to the motor I, the speed of which varies in proportion to the strength of the signal. In this way the speed of the motor is increased to compensate for under-weight parts of the material passing between roller A and detectors B, and vice versa. The tachometer-generator provides a local feed back loop between the motor J and the amplifier H better to ensure the accurate operation of the speed control.

In FIGURE 6 the general arrangement of feed roller A, detectors B, springs S1, S2 and reaction member C is the same as in the arrangement of FIGURE 5 except that the drive to the roller A (not shown) is of conventional type. In this embodiment of the invention closed loop (or feed back) control of the feeding of material is obtained through a system comprising an amplifier H and a servo-motor I. The servo-motor I has an extended shaft K carrying a worm M in mesh with a worm-wheel N. The shaft of the worm-wheel is in the form of a lead screw O in screw-threaded engagement with a nut P pivotally mounted in the end of a pivoted support Q carrying the evener roller R of a hopper feeder.

The transducer in this case is arranged to pass a signal via the amplifier such as will ensure that the speed of the motor I is proportional to the net or integrated deviation in the thickness of the material passing between the roller A and detectors B about a given datum thickness. In this way long term changes in the thickness (and therefore the weight per unit length) are brought under control, since the lead screw O will operate to oscillate the evener roller R so that the mean value of the weight per unit length of the material is the value desired.

The embodiment of FIGURE 7 differs from that of FIGURE 6 in that if the thickness of the material deviates from a desired thickness the reaction member C simply operates a switch T so that the motor I turns in the appropriate direction to lift or lower the evener roller R. The motor is a fixed speed motor and continues to operate until the material reaches the datum thickness.

We claim:

1. In combination with apparatus for continuously processing a traveling mass of fibrous material, a roller, a plurality of detectors disposed side by side, operative portions of said detectors located adjacent the periphery of said roller and in alignment parallel to the axis thereof, a common reaction member for said detectors, first resilient means between said reaction member and each detector, and second resilient means associated with said reaction member and said roller and mounted in compression so as to exert a force tending to urge them together and to load said first resilient means in compression, and means continuously sensitive to variations in the degree of separation of said roller and said reaction member on passage of material of varying thickness between said detectors and said roller and adapted to make compensatory adjustments to said apparatus, said first and second resilient means, said roller, said detectors and said reaction member being disposed so that the forces exerted by said resilient means tend to cause relative movement between said detectors and said roller and between said roller and said reaction member which are substantially in line.

2. The combination of claim 1 in which said resilient means are so constructed that the relationship between the weight per unit length and the thickness of the material to be processed is substantially linear over a given working range.

3. The combination as set forth in claim 1 in which said second resilient means is disposed between the reaction member and a fixed location whereby said variation in the separation of said reaction member and said roller is by virtue of movement of said reaction member.

4. The combination in claim 1 in which said second resilient means is disposed between said roller and a fixed location whereby said variation in the separation of said reaction member and said roller is by virtue of movement of said roller.

5. The combination of claim 1 in which said resilient means are helical springs.

6. The combination of claim 5 in which said helical springs are so constructed that the relationship between the weight per unit length and the thickness of the material to be processed is substantially linear over a given working range.

7. A scutcher having a feed roller, a plurality of detectors disposed side by side, operative portions of said detectors located adjacent the periphery of said feed roller and in alignment parallel to the axis thereof, a common reaction member for said detectors spaced therefrom and parallel with the axis of said roller, spring means between each detector and said reaction member, further spring means associated with said reaction member and said feed roller and mounted in compression so as to exert a force tending to urge them together and to load said first spring means in compression, sensing means continuously sensitive to variations in the degree of separation of said roller and said reaction member on passage of material of varying thickness between said detectors and said roller, and control means for the feed to the scutcher adapted to be operated by said sensing means in accordance with said sensed variations so as to cause a compensatory adjustment of the feed, said first and second spring means, said roller, said detectors and said reaction member being disposed so that the forces exerted by said first and second spring means tend to cause relative movement between said detectors and said roller, and between said roller and said reaction member, which are substantially in line.

8. A scutcher as set forth in claim 7 in which said control means is adapted to control the feed to the machine by controlling the speed of said feed roller.

9. A scutcher as set forth in claim 7 in which said spring means are so constructed that the relationship between the weight per unit length and the thickness of the material to be processed is substantially linear over a given working range.

10. A scutcher as set forth in claim 7 in combination with a feed hopper therefor, said feed hopper having adjustable means controlling the output thereof and in which said control means is adapted to control the feed to the scutcher by adjustment of said means for controlling the output from said hopper.

11. A scutcher in combination with a feed hopper as set forth in claim 10 in which said spring means are so constructed that the relationship between the weight per unit length and the thickness of the material to be processed is substantially linear over a given working range.

References Cited in the file of this patent

UNITED STATES PATENTS

| | | |
|---|---|---|
| 384,826 | Davis | June 19, 1888 |
| 2,770,843 | Strother | Nov. 20, 1956 |

FOREIGN PATENTS

| | | |
|---|---|---|
| 8,097 | Great Britain | of 1889 |
| 715,413 | Great Britain | Sept. 15, 1954 |
| 770,463 | Great Britain | Mar. 20, 1957 |